(12) United States Patent
Kresse

(10) Patent No.: US 7,380,396 B2
(45) Date of Patent: Jun. 3, 2008

(54) METHOD FOR PROTECTING AN EXHAUST AFTERTREATMENT SYSTEM

(75) Inventor: John P. Kresse, Martinsville, IN (US)

(73) Assignee: General Motors Corporation, Detroit, MI (US)

(*) Notice: Subject to any disclaimer, the term of this patent is extended or adjusted under 35 U.S.C. 154(b) by 14 days.

(21) Appl. No.: 11/137,024

(22) Filed: May 25, 2005

(65) Prior Publication Data

US 2006/0266017 A1    Nov. 30, 2006

(51) Int. Cl.
*F01N 3/00* (2006.01)

(52) U.S. Cl. .................. 60/295; 60/274; 60/277; 60/285; 123/672; 123/681; 477/100

(58) Field of Classification Search .......... 60/274, 60/277, 284, 285, 295; 123/672, 681; 477/43, 477/100, 107; 701/104, 54, 56
See application file for complete search history.

(56) References Cited

U.S. PATENT DOCUMENTS

| | | | |
|---|---|---|---|
| 4,364,761 A | 12/1982 | Berg et al. | 55/523 |
| 5,482,148 A | 1/1996 | Dadel et al. | 192/12 |
| 5,842,376 A * | 12/1998 | Dresden et al. | 74/336 R |
| 6,017,291 A * | 1/2000 | Ailes et al. | 477/124 |
| 6,079,204 A * | 6/2000 | Sun et al. | 60/274 |
| 6,389,352 B1 * | 5/2002 | Sun et al. | 701/102 |
| 6,418,713 B1 * | 7/2002 | Gale et al. | 60/284 |
| 6,620,077 B2 * | 9/2003 | Carlson et al. | 477/107 |
| 6,668,547 B2 * | 12/2003 | Paland | 60/285 |
| 6,738,702 B2 * | 5/2004 | Kolmanovsky et al. | 701/54 |
| 6,829,888 B2 * | 12/2004 | Kuenstler et al. | 60/284 |
| 6,865,883 B2 * | 3/2005 | Gomulka | 60/295 |
| 7,007,460 B2 * | 3/2006 | Frieden et al. | 60/284 |
| 7,021,051 B2 * | 4/2006 | Igarashi et al. | 60/295 |
| 7,076,945 B2 * | 7/2006 | Sisken et al. | 60/295 |
| 7,165,391 B2 * | 1/2007 | Lewis | 60/285 |

* cited by examiner

*Primary Examiner*—Tu M. Nguyen

(57) ABSTRACT

The method of the present invention is adapted to protect an exhaust aftertreatment system by preventing the system from becoming clogged and/or damaged during periods of light engine load. According to a preferred embodiment, the present invention protects the exhaust aftertreatment system by increasing the load on the engine during periods of light engine load and/or low exhaust temperature.

6 Claims, 3 Drawing Sheets

METHOD FOR PROTECTING AN EXHAUST AFTERTREATMENT SYSTEM

TECHNICAL FIELD

The present invention is drawn to a method for protecting an exhaust aftertreatment system.

BACKGROUND OF THE INVENTION

Exhaust aftertreatment devices such as diesel particulate filters and devices that catalyze oxides of nitrogen may become clogged and/or damaged if the engine is operated at a light load (i.e., during idle or while traveling downhill) for a long period of time. Such devices are commonly used with diesel engines and will likely be implemented more frequently as vehicle emission standards increase.

SUMMARY OF THE INVENTION

A method of the present invention is adapted to protect an exhaust aftertreatment system by preventing the system from becoming clogged and/or damaged during periods of light engine load. According to a preferred embodiment, the present invention protects the exhaust aftertreatment system by increasing the load on the engine during periods of light engine load and/or low exhaust temperature.

The engine load is preferably increased by applying a transmission retarder device. A method of the present invention is adapted to calculate a desired engine load increase necessary for the regeneration of the aftertreatment device, calculate a desired retarder load operative to induce the desired engine load increase, and apply the desired retarder load. According to an alternate embodiment, additional steps may be implemented to maintain a constant accelerator pedal-to-transmission output torque. More precisely, a method of the present invention is adapted to calculate a transmission output torque reduction caused by the application of the desired retarder load, and command the engine to increase engine output torque by an amount necessary to offset the transmission output torque reduction caused by the retarder.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

A method of the present invention is adapted to protect an exhaust aftertreatment system (not shown), such as the diesel particulate filter disclosed in commonly-owned U.S. Pat. No. 4,364,761, hereby incorporated by reference in its entirety, by preventing the system from becoming clogged and/or damaged during periods of light engine load (i.e., while a vehicle idles or is traveling downhill). Exhaust aftertreatment systems may be regenerated, or cleaned, by high temperature exhaust which burns particles that may otherwise accumulate and clog the system. Exhaust temperature generally rises as engine load increases and exhaust temperature generally falls as engine load decreases. Therefore, during periods of light engine load and/or low exhaust temperature when a vehicle is most susceptible to exhaust aftertreatment system damage, the present invention protects the system by increasing engine load.

Figure 1:
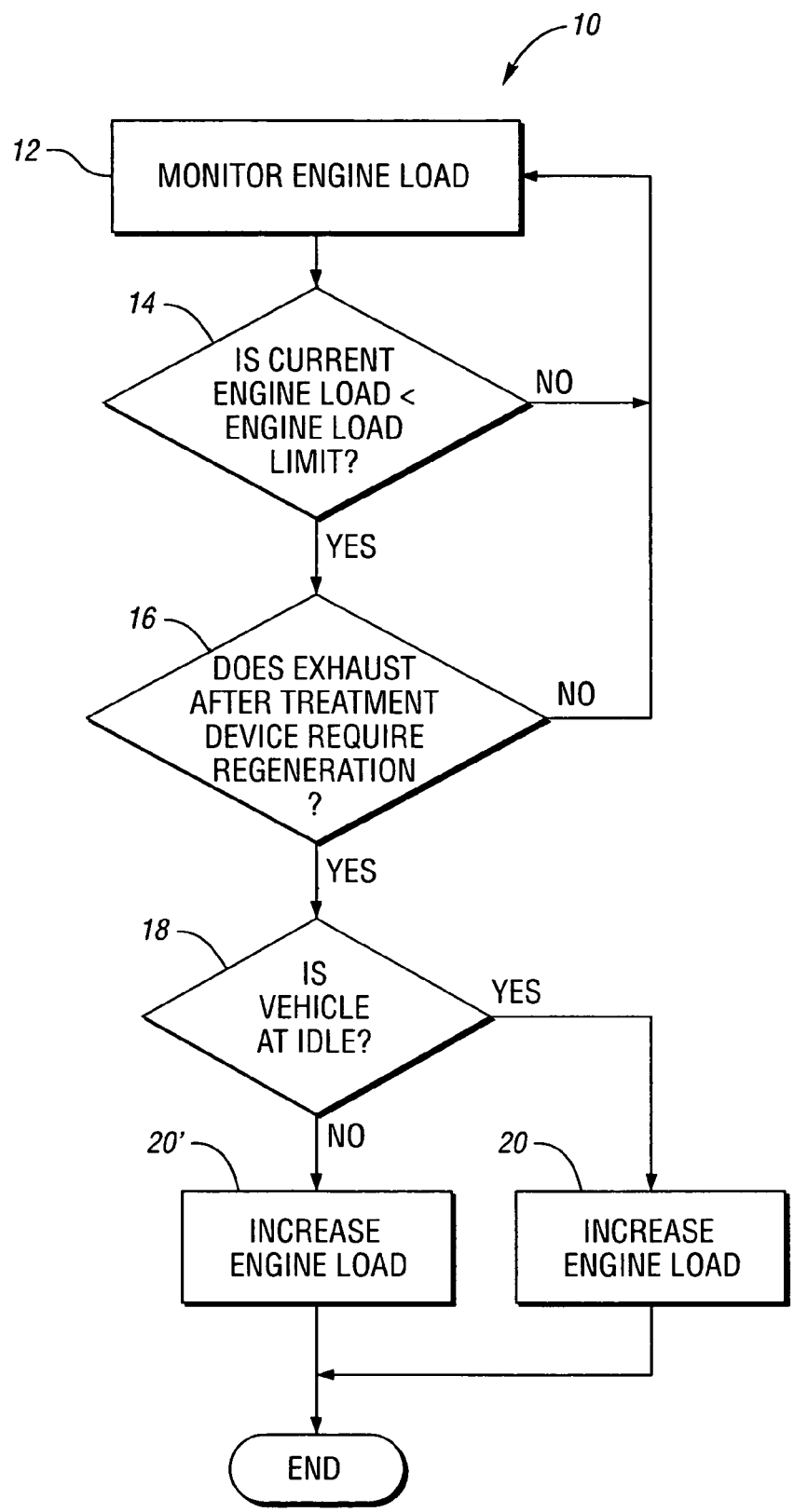
FIG. 1 is a block diagram illustrating a method according to a preferred embodiment of the present invention.

Referring to FIG. 1, a control algorithm 10 of the present invention is shown. The control algorithm 10 preferably resides in a transmission control module (TCM, not shown). The control algorithm 10 is adapted to protect the exhaust aftertreatment system during periods of light engine load and/or low exhaust temperature by increasing engine load.

The control algorithm 10 includes a series of blocks 12-20 representing steps performed by the TCM. As engine load and exhaust temperature are known to be closely related, algorithm 10 preferably monitors the engine load for purposes of determining whether the exhaust aftertreatment device requires regeneration. The algorithm 10 will therefore be described as monitoring engine load, however, it should be appreciated that other parameters may be implemented for such determination. For example, according to an alternate embodiment, exhaust temperature may be monitored to determine whether the exhaust aftertreatment device requires regeneration.

At step 12, the TCM monitors current engine load. At step 14, the TCM determines whether the current engine load is below a predefined engine load limit. If, at step 14, the current engine load is greater than or equal to the engine load limit, the algorithm 10 returns to step 12. If, at step 14, the current engine load is less than the engine load limit, the algorithm proceeds to step 16. According to an alternate embodiment, steps 12-14 may be performed by monitoring current exhaust temperature and comparing it with a predetermined exhaust temperature limit. At step 16, the TCM determines whether the exhaust aftertreatment device requires regeneration as will be described in detail hereinafter. If, at step 16, the exhaust aftertreatment device does not require regeneration, the algorithm 10 returns to step 12. If, at step 16, the exhaust aftertreatment device requires regeneration, the algorithm proceeds to step 18. At step 18, the TCM determines whether the vehicle is at idle. If, at step 18, the vehicle is at idle, the algorithm 10 proceeds to step 20 at which engine load is increased by an amount calculated to regenerate the exhaust aftertreatment device of a vehicle at idle as will be described in detail hereinafter. If, at step 18, the vehicle is not at idle, the algorithm 10 proceeds to step 20' at which engine load is increased by an amount calculated to regenerate the exhaust aftertreatment device of a moving vehicle as will be described in detail hereinafter.

According to a preferred embodiment, step 16, at which the TCM determines whether the exhaust aftertreatment device requires regeneration, may be performed as follows. The determination of whether the exhaust aftertreatment device requires regeneration is generally based on a time limit during which the engine may operate at a load that is less than the engine load limit. It has been observed that an aftertreatment device is unlikely to become clogged if the engine load briefly drops below the engine load limit. Therefore, if the current engine load limit drops below the engine load limit for more than a predetermined amount of time, the exhaust aftertreatment device is regenerated at step 20 or 20'. Alternatively, the determination of whether the exhaust aftertreatment device requires regeneration may be performed by positioning pressure sensors (not shown) upstream and downstream relative to the exhaust aftertreatment device. If the aftertreatment device is clean, the pressure differential across the device ($P_{upstream} - P_{downstream}$) is small. Therefore, if the pressure differential becomes excessive (i.e. greater than a predefined limit), the aftertreatment device may be clogged and is regenerated at step 20 or 20'.

According to a preferred embodiment, steps 20 and 20', at which engine load is increased to regenerate the exhaust aftertreatment device, are performed using a retarder system or device (not shown) such as that disclosed in commonly-owned U.S. Pat. No. 5,482,148, which is hereby incorporated by reference in its entirety. Alternatively, steps 20 and 20' may be performed with any device adapted to increase engine load, such as, for example, a hydraulic hybrid system adapted to produce brake torque and thereby increase engine load while maintaining consistent transmission output torque.

As is well known in the art, retarders are hydrodynamic brakes that utilize relative rotation of mechanical components within the hydraulic fluid present in the retarder to assist in slowing the vehicle in which the retarder is employed. The vehicle is slowed because the retarder applies negative torque, or brake torque, to either the input shaft or output shaft of a transmission. It is also well known that the brake torque applied by an input (and, during non-neutral ranges, an output) retarder increases engine load. Accordingly, steps 20 and 20' are preferably performed by actuating a retarder to increase engine load such that exhaust temperature is increased and the exhaust aftertreatment device is regenerated.

The retarder implemented at steps 20 and 20' is preferably a transmission input retarder disposed between the engine and transmission, however, a transmission output retarder disposed between the transmission and drive shaft may be implemented as well. When the transmission is in neutral, there is no transmission output to the drive shaft, and a transmission output retarder therefore becomes ineffective. As there is relative motion between the engine output and transmission input when the transmission is in neutral, a transmission input retarder is advantageously capable of applying brake torque to increase engine load while the transmission is in neutral.

Figure 2:
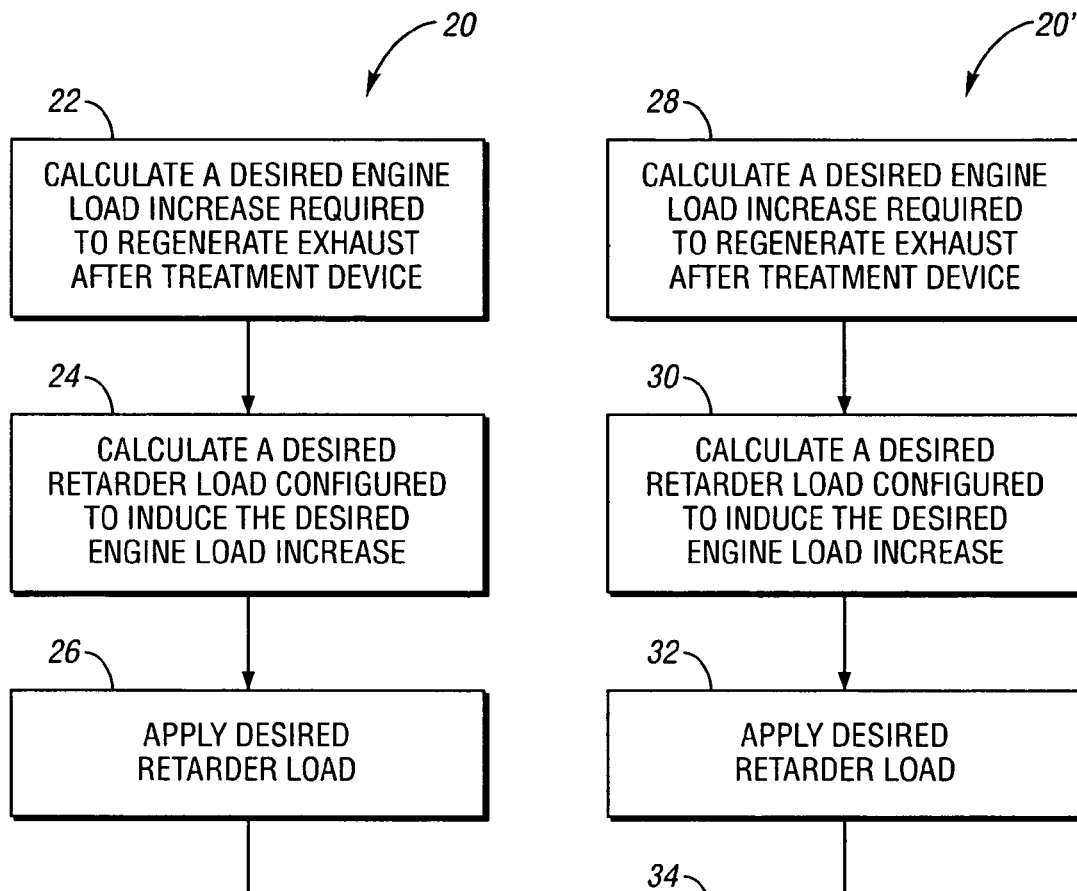
FIG. 2 is a block diagram illustrating a portion of the method of FIG. 1.

Referring to FIG. 2, step 20 of FIG. 1, at which engine load is increased by an amount calculated to regenerate the exhaust aftertreatment device of a vehicle at idle, is shown in more detail. At step 22, the TCM calculates a desired engine load increase adapted to regenerate the exhaust aftertreatment device. The desired engine load increase is typically that which is necessary to bring the current engine load above the engine load limit of step 14. It should, however, be appreciated that the desired engine load increase may alternatively be any amount adapted to regenerate the exhaust aftertreatment device. At step 24, the TCM calculates a desired retarder load configured to induce the desired engine load increase of step 22. At step 26, the TCM applies the desired retarder load.

Figure 3:
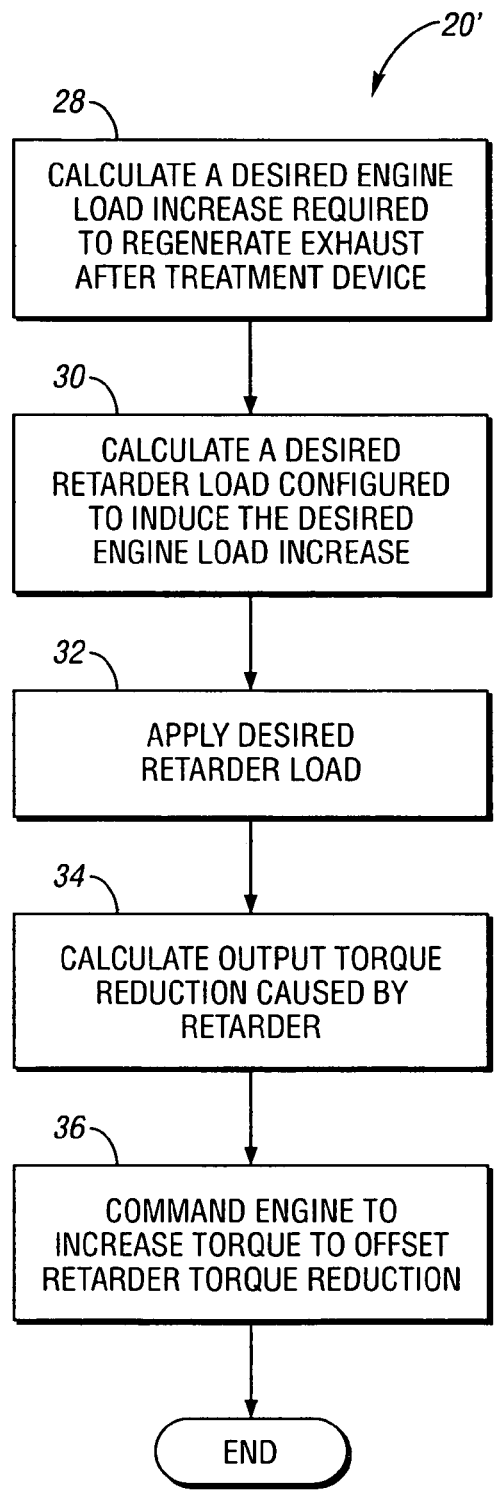
FIG. 3 is a block diagram illustrating a portion of the method of FIG. 1.

Referring to FIG. 3, step 20' of FIG. 1, at which engine load is increased by an amount calculated to regenerate the exhaust aftertreatment device of a moving vehicle, is shown in more detail. At step 28, the TCM calculates a desired engine load increase adapted to regenerate the exhaust aftertreatment device in a manner similar to that of step 22 described hereinabove. At step 30, the TCM calculates a desired retarder load configured to induce the desired engine load increase of step 28. At step 32, the TCM applies the desired retarder load. At step 34, the TCM calculates the reduction of engine output torque caused by the desired retarder load. For an application implementing a transmission input retarder, the reduction of engine output torque may be calculated by dividing the desired retarder load by the torque converter ratio. For an application implementing a transmission output retarder, the reduction of engine output torque may be calculated by dividing the desired retarder load by the product of the current gear ratio and torque converter ratio. At step 36, the engine is commanded (preferably via a serial communications link) to increase engine output torque by an amount necessary to offset the reduction of engine output torque calculated at step 34.

The engine load of a moving vehicle is increased in the manner described at step 20' because applying the retarder while an operator is also applying light throttle changes the pedal to torque relationship and may be objectionable to customers. Therefore, by commanding the engine to increase engine output torque by an amount necessary to offset the reduction of engine output torque caused by the retarder (at step 36), the pedal to torque relationship is maintained and retarder engagement is generally undetectable by the customer (or, at a minimum, maintains consistent driveability).

Figure 4A:
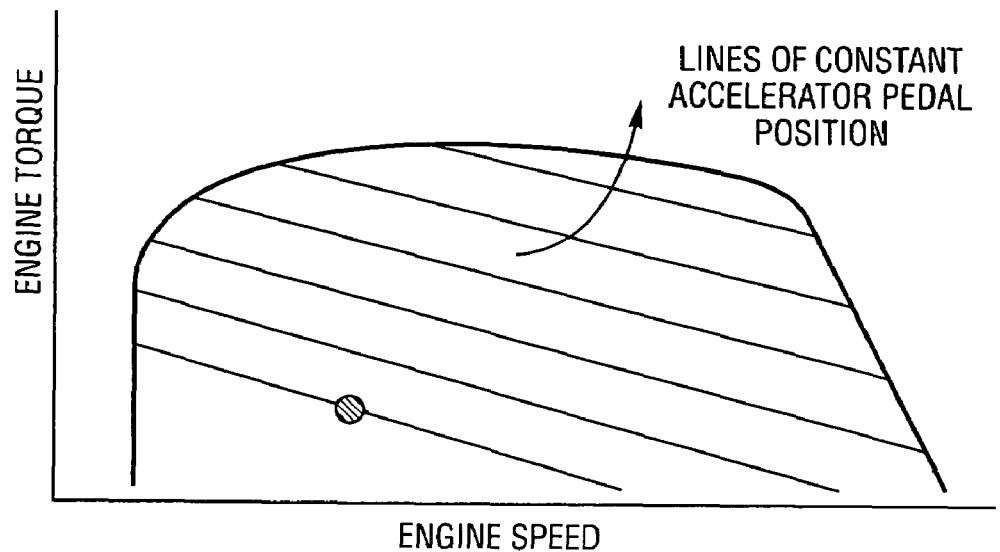
FIG. 4a is a graphical illustration of engine torque vs. engine speed during the application of a retarder device.
Figure 4B:
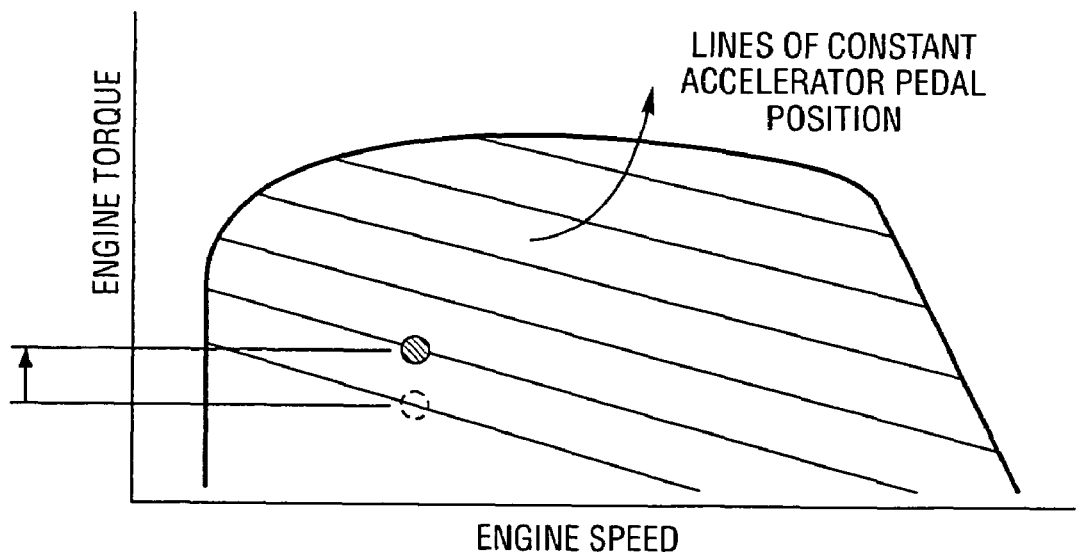
FIG. 4b is a graphical illustration of engine torque vs. engine speed during the application of a retarder device.

Referring to FIGS. 4a and 4b, graphical representations of engine torque vs. engine speed are shown. The downwardly sloping lines represent lines of constant accelerator pedal position. As shown in FIG. 4a, if the accelerator pedal position remains constant while the retarder is applied, and the engine torque remains constant, the transmission output is reduced such that the accelerator pedal-to-transmission output torque ratio is altered which may be observable by a customer. As shown in FIG. 4b, if the engine torque is increased by an amount necessary to negate the retarder torque reduction, the accelerator pedal-to-transmission output torque ratio remains constant to provide equivalent driveability.

According to an alternate embodiment of the present invention, an engine control module (not shown) may be programmed with the procedure for ensuring consistent pedal-to-transmission output torque described hereinabove, and the engine control module may further be adapted to automatically increase engine torque in response to such procedure to protect an exhaust aftertreatment device.

The steps shown in FIGS. 1-3 and described herein need not be performed in the order shown, unless otherwise indicated herein.

While the best modes for carrying out the invention have been described in detail, those familiar with the art to which this invention relates will recognize various alternative designs and embodiments for practicing the invention within the scope of the appended claims.

The invention claimed is:

1. A method for protecting an exhaust aftertreatment system composing:
    establishing a predetermined engine load limit;
    monitoring a current engine load;
    determining whether the current engine load is less than the predetermined engine load limit;
    determining whether the aftertreatment system requires regeneration if the engine load is less than the predetermined engine load limit; and
    increasing the current engine load if regeneration is required and the engine load is less than the predetermined engine load limit by:

applying a retarder device;
calculating a desired engine load increase required to regenerate the exhaust aftertreatment system;
calculating a desired retarder load configured to induce the desired engine load increase; and
applying the desired retarder load.

2. The method of claim 1, wherein said increasing the current engine load includes applying a brake torque at a transmission input.

3. The method of claim 1, wherein said increasing the current engine load includes applying a brake torque at a transmission output.

4. The method of claim 1, further comprising:
establishing a predetermined exhaust temperature limit;
monitoring a current exhaust temperature;
determining whether the current exhaust temperature is less than the predetermined exhaust temperature limit;
determining whether the aftertreatment system requires regeneration if the exhaust temperature is less than the predetermined exhaust temperature limit; and
increasing the current engine load if regeneration is required and the exhaust temperature is less than the predetermined exhaust temperature.

5. The method of claim 1, wherein said increasing the current engine load includes calculating a transmission output torque reduction caused by applying the desired retarder load.

6. The method of claim 5, wherein said increasing the current engine load includes commanding the engine to increase engine output torque by an amount necessary to offset the transmission output torque reduction caused by the retarder.

* * * * *